United States Patent
Traub

[15] 3,663,024
[45] May 16, 1972

[54] SEALING ASSEMBLY
[72] Inventor: Henry A. Traub, Pacific Palisades, Calif.
[73] Assignee: W. S. Shamban & Co., Los Angeles, Calif.
[22] Filed: July 2, 1970
[21] Appl. No.: 51,950

[52] U.S. Cl. .................................................277/165
[51] Int. Cl. .........................................F16j 15/24
[58] Field of Search ....................................277/165

[56] References Cited

UNITED STATES PATENTS

| 3,418,001 | 12/1968 | Rentschler | 277/165 |
| 3,033,578 | 5/1962 | Kellogg | 277/165 |
| 3,268,235 | 8/1966 | Jacobellis | 277/165 |
| 3,149,848 | 9/1964 | Galloway | 277/165 |

*Primary Examiner*—Robert I. Smith
*Attorney*—Smyth, Roston & Pavitt

[57] ABSTRACT

A sealing assembly including a slipper seal and an elastomeric seal with one of the seals circumscribing the other of the seals. The slipper seal includes first and second end portions separated by a central portion with the central portion having a circumferential surface adapted to slidingly and sealingly engage a member. The circumferential surface is generally flat in axial cross section and the first and second end portions taper radially away from such member so that they do not engage such member.

9 Claims, 10 Drawing Figures

PATENTED MAY 16 1972

INVENTOR:
Henry A. Traub

By: Smyth, Roston & Pavitt
ATTORNEYS

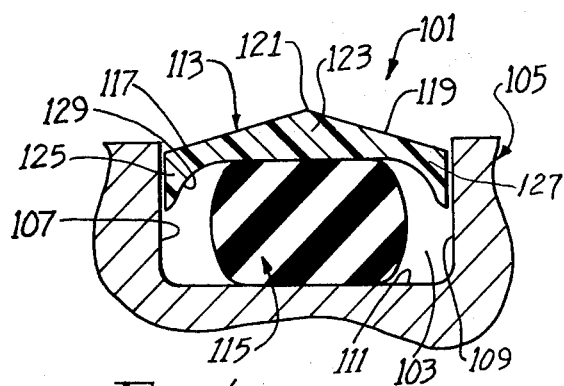
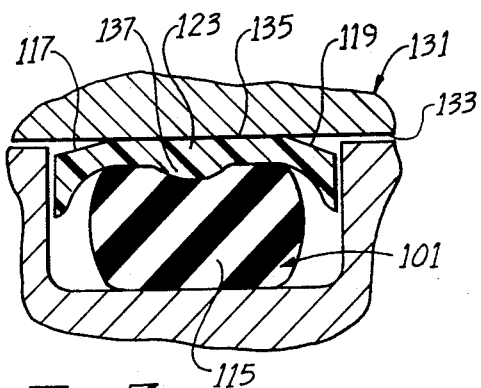
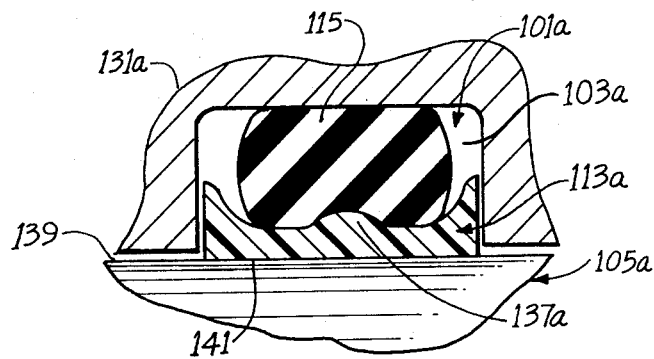
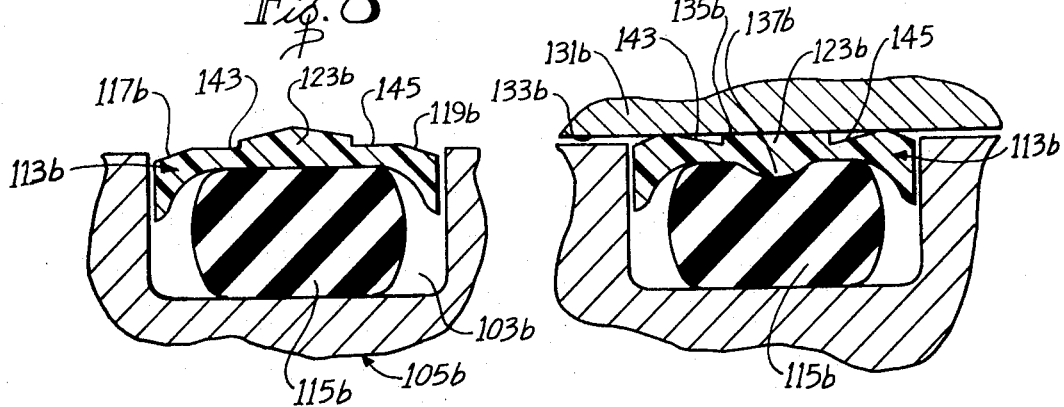
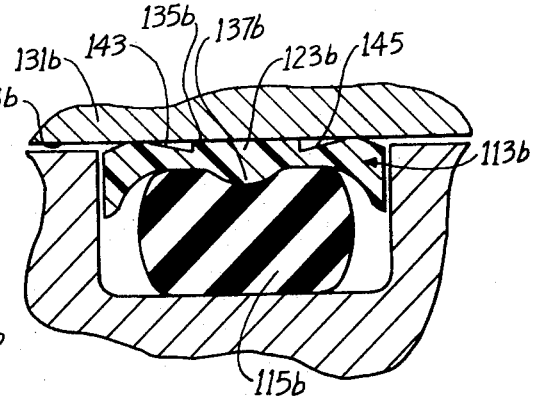

SEALING ASSEMBLY

BACKGROUND OF THE INVENTION

Sealing assemblies are often utilized to provide a substantially fluid tight seal between relatively movable inner and outer members. For example, the outer member may include axially spaced radial walls defining a generally annular groove for receiving the sealing assembly. The sealing assembly is provided in such groove and sealingly engages both of the members.

For some applications resiliently deformable elastomeric seals such as O-rings generally provide a good seal. However, when the members between which the seal is to be formed are relatively movable, it is often desirable to employ a slipper seal to substantially reduce the wear on the elastomeric seal. Slipper seals are constructed of relatively hard, wear resistant materials and as such are adapted to withstand rubbing contact.

In one such construction, the slipper seal has a cylindrical inner surface for slidably engaging the inner member and an outer circumferential surface which is arcuate in axial cross section. The elastomeric seal is radially compressed between the circumferential wall of the groove and the outer circumferential surface of the slipper seal to thereby urge the cylindrical surface of the slipper seal into engagement with the inner member. When fluid under relatively high pressure is supplied to the seal assembly, the pressure acts directly against the elastomeric seal to load the latter and cause the elastomeric seal to apply greater radial inward force on the slipper seal. Because of the high force which is supplied to the slipper seal at relatively high fluid pressure, this type of seal is quite effective as a high pressure seal.

However, one problem with this type of seal is that it is not particularly effective at relatively low fluid pressures. One reason for this is that the slipper seal is typically constructed of relatively hard plastic material such as polytetrafluoroethylene which is deformable only under relatively high pressure. The force applied to the slipper seal due to radial compression of the elastomeric seal is not normally sufficient, absent the benefits derived from high fluid pressure, to cause the slipper seal to form an adequate low pressure seal with the inner member.

Another sealing assembly of the type employing a slipper seal and a resilient member to urge the slipper seal into sealing contact is shown in U.S. Pat. No. 3,223,426. This sealing assembly utilizes a generally channel-shaped slipper seal engageable with both of the relatively movable members and a spring which is received within the channel. One problem with this construction is that the sealing assembly seals against fluid pressure from one direction only. Secondly, the knife edges on the slipper seal would undoubtedly be subject to relatively rapid wear due to the extremely small area of contact between these knife edges and the members they engage. This wear results in reduced compression of the spring. The spring has a relatively steep force-deflection curve, and therefore the low pressure effectiveness of the seal assembly is impaired. Third, deformation of the Teflon envelope under pressure is followed up by the spring. The force applied by the spring is further reduced and applied over a larger area. This can result in deterioration of the low pressure performance of the seal as a result of reduced unit loading.

SUMMARY OF THE INVENTION

The present invention provides a sealing assembly which has substantially improved low pressure sealing characteristics. According to one aspect of the invention this result is achieved, at least in part, by reducing the area of contact between the slipper seal and the member which it sealingly engages. By reducing this area of contact, the unit loading of the slipper seal against such member is increased. For example, if the area of contact is reduced by 50 percent, the unit loading of the slipper seal against the member which it sealingly engages will double.

The sealing assembly is adapted for use between relatively movable inner and outer members. For convenience in much of the description, the sealing assembly is described as an I.D. seal in which the sealing assembly is located in a groove in the outer member and the slipper seal sealingly engages the inner member. It should be understood, however, that the concepts of this invention are not limted to an I.D. seal and that they are equally applicable to an O.D. seal.

The slipper seal includes a central region and first and second end portions extending axially of the central portion with all of such portions circumscribing the inner member. The central region has an inner circumferential surface which slidably and sealingly engages the inner member.

Normally it is desired to maintain the end of the slipper seal facing the fluid under pressure tightly in contact with the inner member. The present invention departs from this conventional practice by separating both of the end portions of the slipper seal from the inner member to thereby achieve the unexpected result of a seal having improved effectiveness at both high and low pressures.

The percent of the axial length of the slipper seal which contacts the inner member can be varied depending upon the amount of unit load increase necessary or desirable for a particular application. The axial dimension of the circumferential surface of the central region should preferably be more than nominal but substantially less than the full axial dimension of the slipper. Thus, the amount that the area of contact is reduced is more than that which would be achieved from a conventional chamfer.

The circumferential surface of the central region generally conforms to an axial length of the member which it sealingly engages. For example, if the inner member is cylindrical, the circumferential surface is also preferably cylindrical and thus flat in axial cross section. If the circumferential surface of the central region is flat in axial cross section rather than pointed, it will wear much less rapidly.

The central region also cooperates in an advantageous manner with the elastomeric ring. The elastomeric ring should be held in radial compression between the circumferential wall of the groove and the central region of the slipper seal with the force of such radial compression acting radially inwardly on the central region of the slipper seal to load the circumferential surface tightly against the inner member. Stated differently, the central axis of the elastomeric ring and the midpoint of the central region should lie substantially in the same radial plane so that the force of radial compression of the O-ring will act centrally through the central region rather than on the end portions of the slipper seal. In addition, the "footprint" of the elastomeric seal should not extend substantially over the end portions of the slipper seal. The footprint of the elastomeric seal is the area of contact between the elastomeric seal and the slipper seal when the sealing assembly is installed in the groove between the inner and outer members and when no fluid under pressure is supplied to the sealing assembly. This assures that no substantial radial inward pressure will be applied, under low fluid pressure conditons, by the O-ring to the end portions of the slipper seal. If substantial force were applied from the elastomeric seal to the end portions, at least some of such force may be utilized in bending of the end portions radially inwardly relative to the central portion.

The sealing assembly of this invention is adapted to be dynamically loaded by fluid under pressure. When this occurs, fluid under pressure enters the groove from one end of the groove and urges the elastomeric ring in the opposite direction. The fluid under pressure applies compressive forces to the elastomeric ring which exerts a radial inward force on the slipper seal tending to force the latter into tighter sealing contact with the innermember. The fluid under pressure forces the elastomeric ring over one of the end portions and as the pressure increases, it ultimately becomes sufficient to deform such end portion radially inwardly into sealing contact with the inner member. Thereafter, both the central region and such end portion engage the inner member. Although this increases the area of contact between the inner member and the slipper seal, this does not occur until the fluid pressure is sufficiently high so that there is no danger of exceeding the allowable leakage tolerance.

According to another aspect of the invention, the low pressure sealing characteristics of the sealing assembly are improved by provinging means for relatively ghighly compressing the resilient deformable seal in the radial direction. This causes the deformable seal to urge the slipper seal against the cooperating member with greater force. This can advantageously be accomplished by providing an annular ridge around the central region of the slipper seal thereby additionally radially compressing the adjacent portions of the deformable seal.

The ridge can be permanently formed on the slipper seal as by machining. Alternatively, the ridge can be provided in response to the positioning of the slipper seal in the groove between the members. In order to accomplish this, the slipper seal should form a medium or heavy interference fit with the member which it is to sealingly engage and surround. In addition, the slipper seal should be deformable about a central circumferentially extending axis and the cross section thereof should be so configured that the ridge will be formed when the slipper seal is positioned around the appropriate member. One form of suitable slipper seal cross section has frustoconical surfaces for surrounding and sealingly engaging one of the members with such surfaces substantially intersecting centrally of the slipper seal.

This aspect of the invention may also utilize the concept of reducing the contact between the slipper seal and the member which it sealingly engages. However, this concept of the invention is not necessarily so limited. The slipper seal may be provided with one or more annular grooves on the surface thereof which engages one of the members to provide wiping action.

The invention, both as to its organization and method of operation together with further features and advantages thereof, may best be understood by reference to the following description taken in connection with the accompanying illustrative drawings.

BRIEF DESCRIPTION OF THE DRAWINGS

FIG. 6 is a fragmentary, axial, sectional view of a fourth form of sealing assembly constructed in accordance with the teachings of this invention with the sealing assembly being installed in a groove.

FIG. 7 is a fragmentary, axial, sectional view similar to FIG. 6 with the sealing assembly being radially compressed between inner and outer members.

FIG. 8 is a fragmentary, axial, sectional view of a fifth form of sealing assembly constructed in accordance with the teachings of this invention.

FIG. 9 is a fragmentary, axial, sectional view of a sixth form of sealing assembly constructed in accordance with the teachings of this invention with the sealing assembly being installed in a groove.

FIG. 10 is a fragmentary, axial, sectional view of the sealing assembly of FIG. 9 being radially compressed between inner and outer members.

DESCRIPTION OF THE PREFERRED EMBODIMENTS

Figure 1:
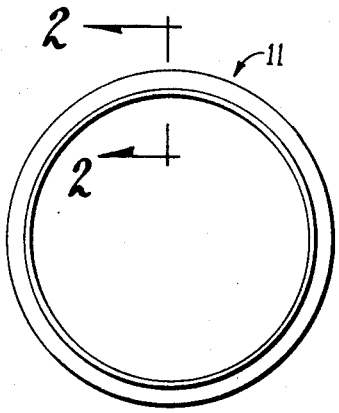
FIG. 1 is a side elevational view of a sealing assembly constructed in accordance with the teachings of this invention.
Figure 2:
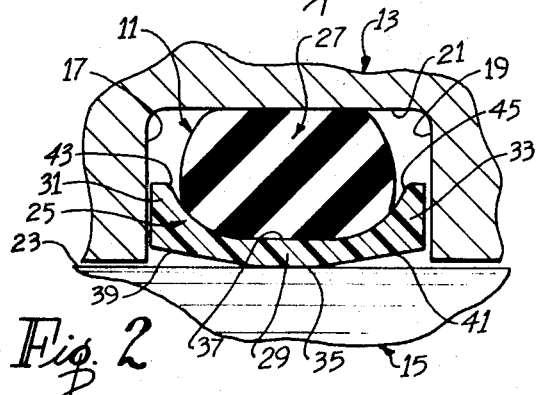
FIG. 2 is an enlarged, fragmentary, axial sectional view through the sealing assembly of this invention with the sealing assembly forming a seal between two members. The sealing assembly is shown with no fluid under pressure being supplied.thereto.

Referring to the drawings and in particular to FIGS. 1 and 2, reference numeral 11 designates a sealing assembly constructed in accordance with the teachings of this invention. As shown in FIG. 1, the sealing assembly 11 is generally annular. As shown in FIG. 2, the sealing assembly 11 provides a seal between an outer member 13 and an inner member or rod 15. The members 13 and 15 are movable relative to each other and either or both of the members may reciprocate and/or rotate. The outer member 13 circumscribes the inner member 15 and has an annular groove for receiving the sealing assembly 11, with the groove being defined by axially spaced end walls 17 and 19 and a circumferential wall 21. The rod 15 has a peripheral surface 23 which is cylindrical in the embodiment illustrated.

The sealing assembly 11 includes an annular slipper seal 25 and an annular elastomeric seal 27 in the form of an O-ring. The slipper seal 25 may be constructed of any suitable wear resistant material with plastic material such as polytetrafluoroethylene being one preferred material. The elastomeric seal 27 may be constructed of any suitable resilient, deformable material such as rubber.

As view in axial cross section (FIG. 2) the slipper seal 25 includes a central portion 29 and end portions 31 and 33 with each of these portions circumscribing the rod 15. The central portion 29 has a cylindrical inner circumferential surface 35 and a coaxial, cylindrical, outer circumferential surface 37 with both of such surfaces being substantially coextensive axially. Accordingly, the central portion 29 is of constant radial thickness.

The end portions 31 and 33 are identical and project in opposite axial directions from the central portion 29. Each of the end portions 31 and 33 projects radially outwardly of the peripheral surface 23 as it extends axially outwardly of the central portion 29. Each of the end portions 31 and 33 progressively thicken radially as they extend axially outwardly of the central portion 29.

Specifically, the end portions 31 and 33 have inner circumferential surfaces 39 and 41, respectively, which are generally frustoconical and which extend radially outwardly of the peripheral surface 23 as they project axially away from the circumferential surface 35. Each of the end portions 31 and 33 also have outer circumferential surfaces 43 and 45, respectively. The circumferential surfaces 43 and 45 are concave in axial cross section to thereby tend to center the elastomeric seal 27 over the central portion 29.

In an uncompressed condition, the elastomeric seal 27 is generally circular in radial cross section. When installed as shown in FIG. 2, the elastomeric seal 27 is radially compressed between the central portion 29 and the circumferential wall 21 of the groove. Elastomeric seal 27 is centered axially relative to the slipper seal 25 with such central orientation tending to be maintained by the slope of the surfaces 43 and 45. In this compressed condition, the elastomeric seal 27 engages the full axial length of the circumferential surface 37 of the central portion 29 and also engages the axial inner regions of the surfaces 43 and 45. With this arrangement, a substantial portion of the force generated through the radial compression of the elastomeric seal 27 acts radially inwardly through the central portion 29 to thereby force the circumferential surface 35 tightly against the peripheral surface 23.

It will be appreciated from FIG. 2 that the axial dimension of the circumferential surface 35 is more than nominal, but substantially less than the full axial dimension of the slipper seal 25. By way of example in the embodiment illustrated, the axial dimension of the circumferential surface 35 is approximately equal to the radius of the elastomeric seal 27 in the unstressed condition.

When little or no fluid under pressure is supplied to the sealing assembly 11, the elastomeric seal 27 forces the circumferential surface 35 into sealing contact with the peripheral surface 23. Because of the reduced area of contact between the slipper seal 25 and the peripheral surface 23 and because the force generated by compression of the elastomeric seal 27 acts radially through the central portion 29, the force generated by the seal 25 is sufficient to cause formation of a good low pressure seal between the surfaces 23 and 35.

Figure 3:
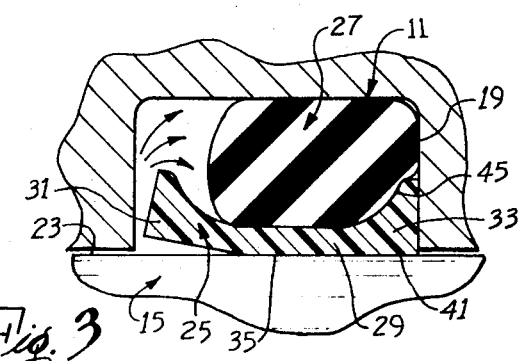
FIG. 3 is a fragmentary, sectional view similar to FIG. 2 with fluid under pressure being supplied to the sealing assembly from the left side of the sealing assembly.

The fluid under pressure passes between the wall 17 and the slipper seal 25 to act on the elastomeric seal 27. As the pressure of the fluid supplied to the sealing assembly 11 increases, the elastomeric seal 27 is deformed to the right as shown in FIG. 3 into contact with the end wall 19. Because the elastomeric material of the seal 27 acts substantially as a liquid when subjected to fluid pressure, it exerts a radial inward force on the slipper seal 25. This has two effects. First, the central portion 29 is urged more tightly into sealing engagement with the peripheral surface 23 of the rod 15. Secondly, the elastomeric seal 27 is urged over the full axial length of the surface 45. Accordingly, the elastomeric seal 27 and the force of the fluid under pressure acting thereagainst tend to urge the end portion 33 radially inwardly. As the pressure of the fluid becomes sufficiently high, the end portion 33 is urged radially inwardly as shown in FIG. 3 so that the inner circumferential surface 41 thereof sealingly engages the peripheral surface 23. The circumferential surface 35 of the central portion 29 remains in fluid tight sealing engagement with the peripheral surface 23. Accordingly, the area of contact between the slipper seal 25 and the peripheral surface 23 increases when fluid under sufficient pressure is supplied to the sealing assembly 11.

If fluid under pressure were supplied to the right end of the sealing assembly 11 as viewed in FIGS. 2 and 3, the elastomeric seal 27 would be urged to the left to ultimately force the end portion 31 into sealing engagement with the peripheral surface 23. Similarly, the groove for the sealing assembly 11 may be located in the rod 15, if desired, in which event the elastomeric seal 27 would be located radially inwardly of the slipper seal 25. In either event, the slipper seal 25 would isolate the elastomeric seal from rubbing contact with the members which does not contain the groove for the sealing assembly.

Figure 4:
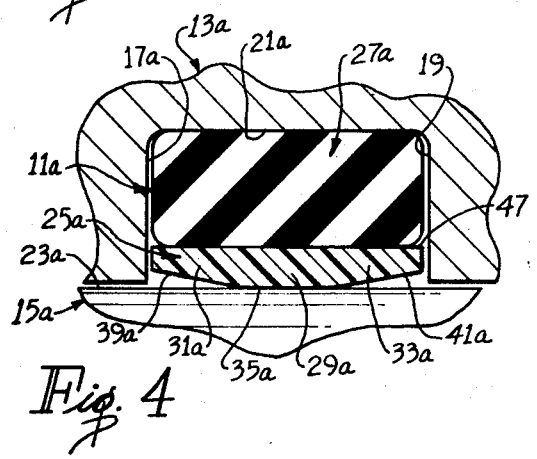
FIG. 4 is a fragmentary, axial, sectional view of a second form of a sealing assembly constructed in accordance with the teachings of the invention.

FIG. 4 illustrates a second embodiment of the invention where corresponding parts are designated by corresponding reference characters followed by the letter a. In FIG. 4, a sealing assembly 11a is positioned in a sealing groove in a member 13a substantially as described hereinabove with reference to FIG. 2. The sealing assembly 11a includes a slipper seal 25a and an elastomeric seal 27a, both of which may be on annular construction and constructed of the same materials as the corresponding elements shown in FIG. 2. The members 13a and 15a may be identical to the corresponding members of FIG. 2 and capable of corresponding relative movement.

The slipper seal 25a has a central portion 29a and end portions 31a and 33a. The central portion 29a has an inner circumferential surface 35a which is flat in axial cross section and which is cylindrical to conform to the configuration of the surface 23a. The end portions 31a and 33a have inner circumferential surfaces 39a and 41a, respectively, which are generally frustoconical. It is apparent that the axial length of the surface 35a is substantially greater than nominal and that the surface 35a extends axially for substantially less then the full axial length of the slipper seal 25a. Similarly, it is apparent that the surfaces 39a and 41a are substantially more than mere chamfers.

The slipper seal 25a differs from the slipper seal 25 in that it has a cylindrical outer peripheral surface 47. Although the central region 29a is of constant radial thickness, the end portions 31a and 33a are of progressively decreasing thicknesses as they extend axially outwardly of the central portion 29a. Also, the peripheral surface 47 cannot act to assist in centering of the elastomeric seal 27a.

Elastomeric seal 27a differs from the elastomeric seal 27 in that it is of generally rectangular axial cross section in the unstressed. In addition, the elastomeric seal 27a extends for substantially the full axial length of the slipper seal 25a. Thus, the elastomeric seal 27a lies relatively closely adjacent the circumferential walls 17a and 19a of the seal groove which serve to center the elastomeric seal.

With the construction shown in FIG. 4, the seal 27a is radially compressed between the circumferential wall 21a and the surface 47 to thereby urge the surface 35a into tight sealing engagement with the surface 23a even when no fluid under pressure is supplied to the sealing assembly 11a. Because the elastomeric seal 27a is located centrally in an axial direction relative to the "footprint" of the slipper seal 25a, a substantial portion of the force of radial compression is directed radially inwardly through the central portion 29a so that it is effective in urging the surface 35a against the surface 23a.

The sealing assembly 11a can be dynamically loaded from either end substantially as described hereinabove with reference to FIG. 3 to thereby increase the force for maintaining the surfaces 35a and 23a in engagement. Depending upon the strength of the slipper seal 25a and the magnitude of the pressure of the fluid supplied to the sealing assembly 11a, the end portions 31a and 33a may or may not flex radially inwardly relative to the central portion 29a in response to the application of fluid under pressure as shown in FIG. 3.

Figure 5:
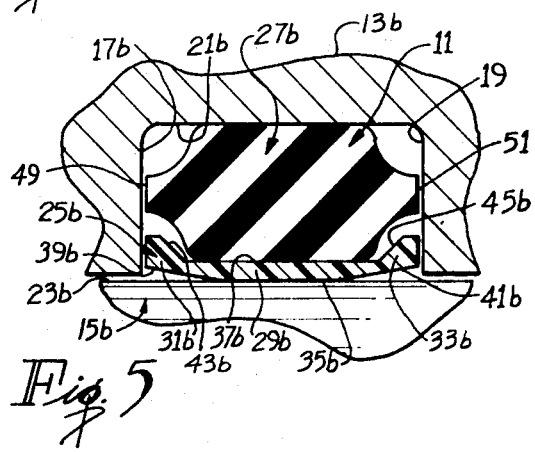
FIG. 5 is a fragmentary, axial, sectional view of a third form of sealing assembly constructed in accordance with the teaching of this invention.

FIG. 5 illustrates a third embodiment of the present invention in which parts corresponding to parts shown in FIG. 2 are designated by corresponding reference characters followed by the letter b. In FIG. 5, the members 13b and 15b may be identical to the members 13 and 15, respectively. The sealing assembly 11b includes a slipper seal 25b and an elastomeric seal 27b.

The slipper seal 25b is substantially identical to the slipper seal 25 except that the central portion 29b is elongated axially and the axial dimensions of the end portions 31b and 33b are reduced. Thus, the surfaces 35b and 37b are coaxial and cylindrical. The end portions 31b and 33b have inner circumferential surfaces 43b and 45b, respectively; however, these surfaces are flat rather than concave in axial cross section.

The seal 27b is identical to the seal 27 except that the former is of plus shape in axial cross section. Thus, the seal 27b includes annular axial projections 49 and 51 extending toward the walls 17b and 19b of the seal groove and terminating in close proximity therewith.

The elastomeric seal 27b is radially compressed between the circumferential wall 21b and the outer circumferential surface 37b of the central region 29b. The elastomeric seal 27b does not normally contact the surfaces 43b and 45 b and accordingly, the full force of radial compression of the elastomeric seal 27b is directed radially against the central portion 29b to thereby urge the circumferential surface 35b into sealing engagement with the peripheral surface 23b. The projections 49 and 51 and the surfaces 43b and 45b tend to maintain the elastomeric seal 11b centered axially relative to the slipper seal 25b. As shown in FIG. 5, the circumferential surface 35b has an axial dimension which is substantially greater than nominal and which issubstantially less than the full axial dimension of the slipper seal 25b. Similarly, the frustoconical surfaces 39b and 41b are substantially more than mere chamfers.

At low pressures, the force of radial compression of the elastomeric seal 27b represents a substantial portion of the sealing force exerted against slipper seal 25b. However, the sealing assembly 11b can be loaded dynamically sustantially as described herein above with reference to FIG. 3.

FIG. 6 shows an O.D. sealing assembly 101 installed in a groove 103 of a rod 105. The groove 103 is defined by radial walls 107 and 109 and by a circumferential wall 111. The sealing assembly 101 includes a slipper seal 113 and a resilient deformable seal 115 which, in the embodiment illustrated is an O-ring of elastomeric material.

The slipper seal 113 has peripheral frustoconical furfaces 117 and 119 which intersect along a circular line 121 centrally of the slipper seal 113. The slipper seal has a central portion 123 and radially thickened end portions 125 and 127. The slipper seal 113 has a peripheral surface 129, the outer ends of which curve to laterally confine the deformable seal 115 and the central region of which is relatively flat in the position shown in FIG. 6. The slipper seal 113 is resiliently deformable about a central circumferentially extending axis.

When an outer member or cylinder 131 is installed over the sealing assembly 101, the sealing assembly assumes the configuration shown in FIG. 7. The cylinder 131 has a cylindrical surface 133 which engages portions of the frustoconical surfaces 117 and 119 and converts them into a cylindrical sealing surface 135 thereby axially shortening the frustconical surfaces 117 and 119. The cylindrical sealing surface 135 is formed because the diameter of the slipper seal 113 at the circular line 121 forms a medium interference fit with the surface 133 of the cylinder 131. The installation of the cylinder 131 also causes the formation of an annular ridge 137 in the central portion 123. The ridge 137 is formed by resilient displacement of the plastic material of the slipper seal 113 which results due to the medium interference fit between the slipper seal and the cylinder 131.

The change in cross section between FIGS. 6 and 7 resulting from installation of the cylinder 131 has several important effects. First, the interference fit between the cylindrical sealing surface 135 and the surface 133 assists in providing good low pressure characteristics. Second, the cylinder 131 applies a radial inward force on the seal 115 therby radially squeezing the seal. Third, the deformable seal 115 is compressed radially an additional amount due to the presence of the annular ridge 137. The radial squeeze on the deformable ring 115 causes the latter to urge the slipper seal 113 into even tighter sealing engagement with the surface 133.

The interference fit and the formation of the ridge 137 cooperate to produce very good low pressure sealing characteristics. In addition, the elimination of the line 121, and the formation of the cylindrical surface 135 eliminates the rapid wear which would accompany line contact of the slipper seal 113 against the cylindrical surface 133. Unit loading of the slipper seal 113 remains relatively high in that the end portions of the surfaces 117 and 119 are not in contact with the surface 133.

FIG. 8 shows an emodiment of the invention which is quite similar to the embodiment of FIGS. 6 and 7. Parts of the embodiment of FIG. 8 corresponding to parts of the embodiment of FIGS. 6 and 7 are designated by corresponding reference numerals followed by the letter $a$.

The sealing assembly 101a differs from the sealing assembly 101 in three respects. First, the sealing assembly 101a is an I.D. seal whereas the sealing assembly 101 is an O.D. seal. Thus the groove 103a is formed in the cylinder 131a, and the slipper seal 113a sealingly engages a cylindrical surface 139 of the rod 105a. Second, the ridge 137a is permanently formed as part of the slipper seal 113a and is not formed as a result of installation of the slipper seal 113a in the groove 103a between the outer member 131a and the rod 105a.

Third, the slipper seal 113 has an inner peripheral surface 141 which is permanently cylindrical and does not assume the cylindrical configuration merely because the rod 105a is inserted therein. Moreover, every point along the peripheral surface 141 including the end portions thereof engages the surface 139 and the rod 105a. With this construction, it is preferred to have a heavy diametral interference between the peripheral surface 141 and the surface 139. The sealing assembly 101a functions in substantially the same manner as the sealing assembly 101 in providing good low pressure sealing characteristics.

FIGS. 9 and 10 show another embodiment of the invention which is similar to the embodiment shown in FIGS. 6 and 7. Parts of the embodiment of FIGS. 9 and 10 corresponding to parts of the embodiment shown in FIGS. 6 and 7 are shown by corresponding reference numerals followed by the leter $b$. The embodiment of FIGS. 9 and 10 is identical to the embodiment of FIGS. 6 and 7 except for the presence of two annular grooves 143 and 145 formed in axially spaced relationship on the frustconical surfaces 117b and 119b. The annular grooves 143 and 145 form the central portion 123b into a crown for the slipper seal 113b.

When the sealing assembly 113b is installed in the groove 103b between the rod 105b and the cylinder 131b, the slipper seal 113b and the deformable seal 115b assume the configuration shown in FIG. 10. The slipper seal 113b forms a medium diametral interference with the cylindrical surface 133b and except for the presence of the grooves 143 and 145, the configuration of the slipper seals 113b and 113 in the installed condition is identical. Thus, the slipper seal 113b has a ridge 137b and a cylindrical sealing surface 135b formed in the manner described above in connection with FIGS. 6 and 7. Moreover, the grooves 143 and 145 define a sharp boundary for the central portion or crown 123b and this acts to break the oil film on the surface 133b. This insures better wiping action than if such sharp edge were not provided.

The slipper seals and the deformable seals of FIGS. 6 – 10 may be constructed of material as described above in connection with FIGS. 1 – 5.

Although exemplary embodiments of the invention have been shown and described, many changes, modifications and substitutions may be made by one having ordinary skill in the art without necessarily departing from the spirit and scope of this invention.

I claim:

1. A sealing assembly comprising:
   a slipper seal of generally ring-like configuration, said slipper seal being constructed of a plastic material and said slipper seal including first and second end portions and a central portion axially separating said end portions;
   said slipper seal having first and second peripheral surfaces, said first peripheral surface having a low coefficient of friction, said second peripheral surface defining a ridge extending circumferentially along and circumscribing said central portion; and
   an elastomeric seal having a ring-like configuration engaging said second peripheral surface and said ridge, one of said seals circumscribing the other of said seals, said elastomeric seal being devoid of a mating groove to receive said ridge when said elastomeric seal is unstressed whereby said ridge resiliently deforms said elastomeric seal.

2. A sealing assembly for use between first and second relatively movable members wherein at least one of said member has a circumferentially extending wall partially defining a groove, said sealing assembly comprising:
   a slipper seal of ring-like configuration positionable at least partially in said groove, said slipper seal including first and second end portions axially separated by a central portion with each of said portions being of ring-like configuration;
   said central portion having a circumferential surface which is slidably engageable with said other member, said circumferential surface having a relatively low coefficient of friction;
   a resiliently deformable seal positionable in said groove and radially compressible between the circumferential wall of said groove and the central portion of said slipper seal whereby the slipper seal substantially isolates the elastomeric seal from simultaneous sliding contact with both of said members; and
   means for defining a circumferentially extending annular ridge on said central portion on the side thereof confronting said deformable seal at least when said seals are in said groove between said members to further radially compress said deformable seal radially of said central portion of said slipper seal whereby said deformable seal urges said central portion tightly against said other member.

3. A sealing assembly as defined in claim 2 wherein said last mentioned means includes means responsive to the positioning of said seals in said groove between said members for forming said ridge.

4. A sealing assembly as defined in claim 2 wherein said slipper seal has a circumferential surface for confronting said other member, said last mentioned circumferential surface having at least one circumferentially extending groove therein at least when said seal is installed in said groove between said members.

5. A sealing assembly as defined in claim 2 wherein said last mentioned means defines said ridge even when the seals are not positioned in said groove and between said members.

6. A sealing assembly as defined in claim 2 wherein said central region is of maximum radial thickness at the center thereof and is of reduced thickness axially outwardly of said center.

7. A sealing assembly as defined in claim 2 wherein said circumferential surface extends axially for substantially less than the full axial length of said slipper seal, said end portions being out of engagement with said other member at least when the sealing assembly is installed between said members and no fluid pressure is supplied thereto.

8. A sealing assembly as defined in claim 7 wherein said central portion has a second circumferential surface engageable with the deformable seal, said second circumferential surface being substantially flat in axial cross section when the slipper seal is unstressed.

9. A sealing assembly comprising:

an inner member;

an outer member substantially circumscribing the inner member, one of said members at least partially defining a circumferentially extending groove;

a slipper seal of ring-like configuration positionable at least partially in said groove, said slipper seal including first and second end portions axially separated by a central portion with each of said portions being of ring-like configuration;

said central portion having a circumferential surface which is slidably engageable with the other of said members, said circumferential surface having a relatively low coefficient of friction and forming an interference fit with said other member;

a resiliently deformable seal positionable in said groove and radially compressible between the circumferential wall of said groove and the central portion of said slipper seal whereby the slipper seal substantially isolates the elastomeric seal from simultaneous sliding contact with both of said members; and means for defining an annular ridge on said central portion on the side thereof confronting said deformable seal when said seals are in said groove between said members to further radially compress said deformable seal radially of said central portion of said slipper seal whereby said deformable seal urges said central portion tightly against said other member.

* * * * *